UNITED STATES PATENT OFFICE.

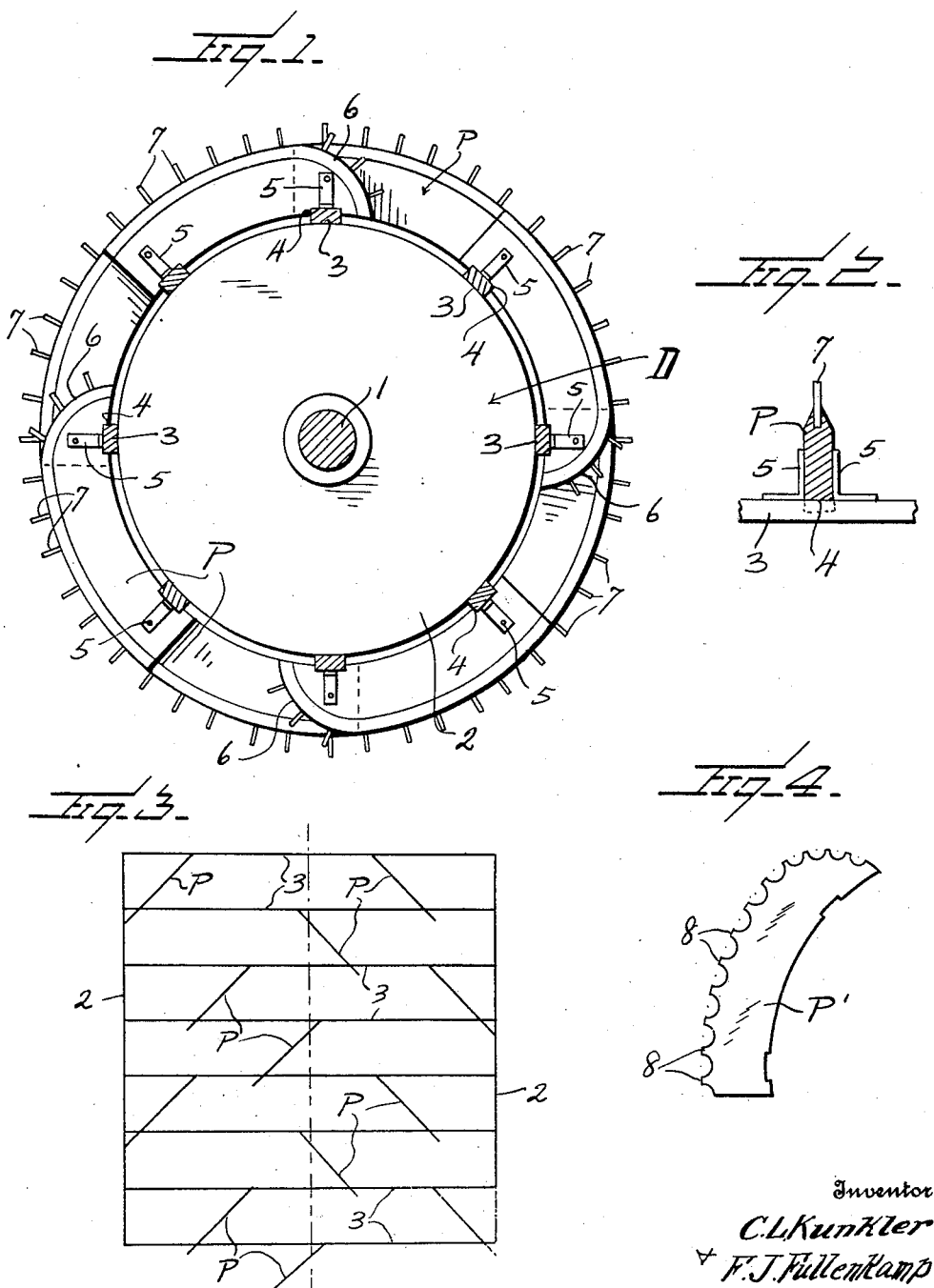

CHARLES L. KUNKLER AND FRANK J. FULLENKAMP, OF COLDWATER, OHIO.

FERTILIZER DISTRIBUTOR.

1,403,695.   Specification of Letters Patent.   Patented Jan. 17, 1922.

Application filed February 5, 1921. Serial No. 442,817.

*To all whom it may concern:*

Be it known that we, CHARLES L. KUNKLER and FRANK J. FULLENKAMP, citizens of the United States, residing at Coldwater, in the county of Mercer and State of Ohio, have invented certain new and useful Improvements in Fertilizer Distributors, of which the following is a specification, reference being had to the accompanying drawings.

This invention relates to certain improvements in fertilizer distributors and has relation more particularly to a rotary distributing element comprised therein, and it is an object of the invention to provide a novel and improved element of this general character wherein the fertilizer, and particularly manure, is effectively comminuted and thrown beyond the opposite ends of the distributing element.

Another object of the invention is to provide a novel and improved device of this general character embodying a plurality of paddles, each of which has its outer edge portion provided with cutting and tearing means and wherein one end portion of each of said paddles has its outer or working margin disposed on such curvature to prevent clogging.

The invention consists in the details of construction and in the combination and arrangement of the several parts of our improved fertilizer distributor whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a transverse sectional view taken through a distributing element constructed in accordance with an embodiment of our invention.

Figure 2 is a fragmentary view illustrating one of the paddles in cross section with certain of the parts concomitant thereto in elevation.

Figure 3 is a diagrammatic view illustrating the relative arrangement of the paddles, and Figure 4 is a view in side elevation of a paddle constructed in accordance with a further embodiment of our invention.

Our improved distributing element is adapted to be mounted and operated in any manner now generally employed in connection with fertilizer distributors embodying a rotary distributing element and as such mounting and operation forms no part of our present invention, a detail illustration and description thereof is believed to be unnecessary.

As herein disclosed, our improved distributing element D comprises a supporting shaft or axle 1 having fixed thereto one or more discs or plates 2 carrying the slats 3 disposed in a direction longitudinally of the shaft or axle 1. The slats 3 are preferably equi-distantly spaced in a direction circumferentially of the distributor.

Each pair of adjacent slats 3 is connected by one or more paddles P disposed on an incline of substantially forty-five degrees with respect to the slats. Alternate pairs of adjacent slats 3 are connected, in the present embodiment of our invention and as particularly illustrated in Figure 3, by two paddles P while the intermediate or remaining pairs of adjacent slats 3 are connected by a single paddle P.

The pairs of paddles P are reversely inclined with one of said paddles positioned immediately adjacent an end portion of the distributor with a second paddle arranged a desired distance from the opposite end. Adjacent pairs of paddles are reversely arranged with respect to the center of the distributing element D as is clearly illustrated in Figure 3. Adjacent single paddles P are also reversely related and each of said paddles extends a short distance beyond the longitudinal center of the element D. As is clearly illustrated in Figure 3, the paddles P are so arranged that as the distributing element D revolves, there is always a working edge of a paddle P in a position to have requisite action on the fertilizer.

Each of the paddles P is arcuate and in its inner or back marginal portion is provided with the recesses 4 to snugly receive the slats 3. Secured to said paddle P and the coacting slats 3 are the brace or anchoring members or irons 5 whereby said paddle is effectively maintained in applied position. Each of the members or irons 5 is substantially L-shaped so that said members or irons serve to hold the paddle P against lateral movement which would otherwise materially reduce the efficiency thereof.

The outer end portion or entering edge of each of the paddles P is gradually reduced in thickness, whereby said working edge portion 6 of the paddle is curved. This curved end or entering edge 6 prevents clogging which would materially interfere with the requisite operation of the distributing element D.

The working or outer marginal portion of each of the paddles P is formed into a knife edge and extending outwardly from said working edge of the paddle and coplanar therewith are the metallic fingers 7, the paddle P being preferably of wood.

As the element D rotates, the paddles P effectively penetrate the fertilizer to be distributed and said paddles P are of particular advantage when said fertilizer constitutes manure. As the paddles P pass through the fertilizer, the fingers 7 cut and tear through such fertilizer, or more especially manure, whereby the same is effectively comminuted and the angle of the paddles P with respect to the slats 3 or the axis of the element result in the fertilizer being distributed in the best possible manner and not only rearwardly but beyond the opposite ends of the distributing element D.

The form of paddle P' illustrated in Figure 4 is preferably made of one piece of steel or other metal but is of substantially the same shape or configuration as a paddle P. The working edge portion of the paddle P' is cut to provide the integral teeth 8, said teeth 8 operating to comminute the fertilizer to the same advantage as the fingers 7.

A fertilizer distributor provided with paddles constructed in accordance with an embodiment of our invention is, as before stated, particularly adapted for use in connection with manure and especially manure containing stalks. It has been fully demonstrated in actual practice that our distributing element can be employed to decided advantage and when used does not gather stalks or the like but effectively severs or cuts the same so that they may be readily distributed.

From the foregoing description it is thought to be obvious that a fertilizer distributor constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. In combination with a rotary distributing element for a fertilizer distributor, a plurality of paddles mounted thereon and arranged in rows extending longitudinally of the element and spaced circumferentially of the distributor, alternate rows comprising two paddles arranged at opposite sides of the longitudinal center of the distributor and inclined in reverse directions, the remaining rows of paddles comprising a single paddle, each of said single paddles being substantially at right angles to a paddle of one of the first named rows.

2. In combination with a rotary distributing element for a fertilizer distributor, a plurality of paddles mounted thereon and arranged in rows extending longitudinally of the element and spaced circumferentially of the distributor, alternate rows comprising two paddles arranged at opposite sides of the longitudinal center of the distributor and inclined in reverse directions, the remaining rows of paddles comprising a single paddle, each of said single paddles being substantially at right angles to a paddle of one of the first named rows, adjacent single paddles being reversely related and extending beyond the opposite sides of the longitudinal center of the distributor.

3. In combination with a rotary distributing element for a fertilizer distributor, a plurality of paddles mounted thereon and arranged in rows extending longitudinally of the element and spaced circumferentially of the distributor, alternate rows comprising two paddles arranged at opposite sides of the longitudinal center of the distributor and inclined in reverse directions, the remaining rows of paddles comprising a single paddle, each of said single paddles being substantially at right angles to a paddle of one of the first named rows, adjacent single paddles being reversely related and extending beyond the opposite sides of the longitudinal center of the distributor, each of the intermediate single paddles intersecting the planes occupied by the adjacent single paddles.

4. In combination with a rotary distributing element for a fertilizer distributor, a plurality of paddles mounted thereon and arranged in rows extending longitudinally of the element and spaced circumferentially of the distributor, alternate rows comprising two paddles arranged at opposite sides of the longitudinal center of the distributor and inclined in reverse directions, the remaining rows of paddles comprising a single paddle, each of said single paddles being substantially at right angles to the central portion of a paddle of one of the first named rows, adjacent single paddles being reversely related and extending beyond the opposite sides of the longitudinal center of the distributor.

5. In combination with a rotary distributing element for a fertilizer distributor, a plurality of paddles mounted thereon and arranged in rows extending longitudinally of the element and spaced circumferentially of the distributor, alternate rows comprising two paddles arranged at opposite sides of the longitudinal center of the distributor and inclined in reverse directions, the remaining rows of paddles comprising a single paddle, each of said single paddles being substantially at right angles to the central portion of a paddle of one of the first named rows, adjacent single paddles being reversely related and extending beyond the opposite sides of the longitudinal center of the distributor, each of the intermediate single paddles intersecting the planes occupied by the adjacent single paddles.

In testimony whereof we hereunto affix our signatures.

CHARLES L. KUNKLER.
FRANK J. FULLENKAMP.